United States Patent

Yogo et al.

[11] Patent Number: 5,106,550
[45] Date of Patent: Apr. 21, 1992

[54] METHOD OF PRODUCING CERAMIC ROTOR

[75] Inventors: Tetsuji Yogo; Yoshinori Hattori; Motohide Ando, all of Aichi; Yasushi Katano, Kanagawa, all of

[73] Assignees: NGK Spark Plug Co., Ltd., Nagoya; Nissan Motor Co., Ltd., Yokohama, both of Japan

[21] Appl. No.: 192,434

[22] Filed: May 11, 1988

[30] Foreign Application Priority Data

May 13, 1987 [JP] Japan .................. 62-115419

[51] Int. Cl.[5] .............................. C04B 37/00
[52] U.S. Cl. .......................... 264/60; 264/63
[58] Field of Search ....................... 264/60, 63

[56] References Cited

U.S. PATENT DOCUMENTS

| | | | |
|---|---|---|---|
| 4,096,120 | 6/1978 | Grunke | 264/60 |
| 4,207,226 | 6/1980 | Storm | 264/60 |
| 4,368,166 | 1/1983 | Hinton | 264/60 |
| 4,460,527 | 7/1984 | Kato | 264/60 |
| 4,579,703 | 4/1986 | Adlerborn et al. | 264/58 |

FOREIGN PATENT DOCUMENTS

| | | |
|---|---|---|
| 2651311 | 5/1977 | Fed. Rep. of Germany . |
| 2707835 | 9/1977 | Fed. Rep. of Germany . |
| 3007374 | 9/1980 | Fed. Rep. of Germany ........ 264/60 |
| 55-23097 | 1/1980 | Japan . |
| 57-17468 | 1/1982 | Japan . |
| 60-11276 | 1/1985 | Japan . |

Primary Examiner—James Derrington
Attorney, Agent, or Firm—Foley & Lardner

[57] ABSTRACT

A ceramic rotor is constituted by a shaft portion and a disk portion. The shaft portion and the disk portion are joined to constitute a single body by sintering. The shaft portion and the disk portion are so formed that the amount of contraction of the shaft portion at the time of sintering is larger by 0.1% to 3% than that of the disk portion such that compresson stress is induced in the disk portion.

5 Claims, 1 Drawing Sheet

5,106,550

METHOD OF PRODUCING CERAMIC ROTOR

BACKGROUND OF THE INVENTION

1. Field of the Invention

The present invention relates to a method of producing a ceramic rotor having a shaft portion and a circular disk portion as a ceramic turbine wheel for a turbocharger, gas turbine, etc.

2. Description of the Prior Art

Various methods as slip casting, injection molding, press forming, cold isostatic pressing, etc. are known for producing ceramic rotors of the above described kind. Among those methods, injection molding is widely used for reasons of excellence in mechanical strength and dimensional accuracy of molded intermediate product, convenience in mass production, etc.

While the injection molding is useful in case the product is complicated in shape and to be produced in a large quantity, it actually encounters a problem that many of intermediate products are liable to cause breakage, deformation, etc. due to long time heating at the time of dewaxing, resulting in a strict limitation or restriction on the shape and thickness of the product.

For the purpose of solving the problem, a ceramic composition for injection molding which can be easily dewaxed even when the product is thick-walled has been proposed by Japanese provisional patent publication Nos. 54-9516 and 55-23097. It has further been proposed by Japanese provisional patent publication No. 57-17468 a dewaxing process for removing binder from the product by heating while holding the same in pressurized gas of pressure higher than an atomospheric pressure. The above ceramic composition and the dewaxing process are effective for solving the above problem to some extent but not satisfactorily.

For solving the above problem, there has also been proposed by Japanese provisional patent publication No. 60-11276 a method of producing a ceramic rotor. The method consists of producing the disk portion of a rotor by injection molding, the thickness of which disk portion is so determined as to enable the disk portion to be dewaxed easily, producing the shaft portion by cold isostatic pressing so as to be dewaxed easily, assembling the disk portion and the shaft portion together by cold isostatic pressing and sintering the assembled disk portion and shaft portion into a single sintered body. In this instance, the disk portion and the shaft portion effect different expansions and contractions during sintering. Due to this, tension occurs in the disk portion at the time of sintering and remains thereat as residual stress after the sintering. In addition to the residual stress, the rotor, particularly the disk portion thereof is subjected to centrifugal stress at the time of rotation. Since the allowable stress of the rotor is limited by the tension strength of the material forming the rotor, the residual stress in the disk portion causes an increased limitation or restriction on the design of product.

SUMMARY OF THE INVENTION

In accordance with the present invention, there is provided a novel and improved method of producing a ceramic rotor.

The method comprises constructing the ceramic rotor from an inner member and an outer tubular member which are independent from each other, preparing the inner and outer members in such a way that the amount of contraction of the inner member at the time of sintering is larger than that of the outer member, joining the inner and outer members together, and sintering the inner and outer members so as to constitute a single body.

In one form of the invention, the amount of contraction of said inner member at the time of contraction is determined so as to be larger by 0.1% to 3% than that of said outer member.

The above method is effective for solving the above noted problems inherent in the conventional method of producing a ceramic rotor.

It is accordingly an object of the present invention to provide a novel method of producing a ceramic rotor which is excellent in mechanical strength.

It is another object of the present invention to provide a novel method of the above character which can reduce the design restrictions of the rotor.

DETAILED DESCRIPTION OF THE PREFERRED EMBODIMENTS

Figure 1:
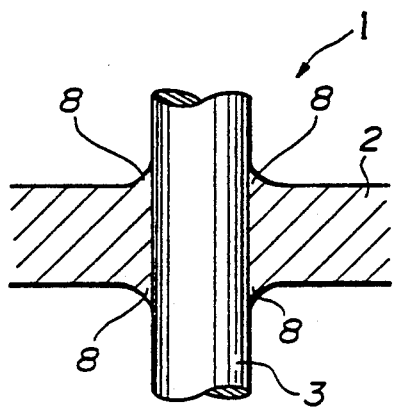
FIG. 1 is a schematic sectional view of a ceramic rotor according to an embodiment of the present invention.

Referring to FIG. 1, a ceramic rotor is generally indicated by the reference numeral 1 and consists of an outer member or tubular disk portion 2 and an inner member or shaft portion 3 fitted in the center of the disk portion 2 to be integral therewith. The disk portion 2 and the shaft portion 3 are structured so that the disk portion 2 has compression stress directed radially inwardly thereof in the place 8 where maximum centrifugal stress is induced at the time of critical speed of rotation of the rotor 1 for breakage. To this end, the disk portion 2 and the shaft portion 3 are so designed that the amount of contraction of the shaft portion 3 at the time of sintering is larger by 0.1% to 3% than that of the disk portion 2. The shaft portion 3 is thus adapted to effect large contraction at the time of sintering and therefore be more porous than the disk portion 2. By this, after sintering compression stress is induced in the disk portion 2 which is subjected to centrifugal stress at the time of rotation.

The disk portion 2, on the contrary to the shaft portion 3, is adapted to be less porous and effect less contraction than the shaft portion 3. Powder for forming the disk portion 2 is thus compacted by higher pressure. In case of forming a turbine wheel for a turbocharger, etc., it is preferable that a vaned disk portion which is inevitably formed by injection molding is dewaxed after forming and then processed by cold isostatic pressing so as to be high in density.

In the above, it is to be noted that when the difference of contraction between the disk portion 2 and the shaft portion 3 is smaller than 0.1% there is not induced any compression stress in the disk portion 2 whereas when larger than 3% a gap is produced between the disk portion 2 and the shaft portion 3 at the time of sintering to allow the both to be separated from each other. Only when the above difference is within the range of 0.1% to 3%, tension is induced in the shaft portion 3 which is subjected to smaller centrifugal force at the time of rotation whereas compression stress is induced in the disk portion 2 which is subjected to larger centrifugual force. This results from the fact that when a first molded body of which contraction at the time of sintering is larger is joined with a second molded body of which contraction at the time of sintering is smaller and is sintered together with same, the first molded body of larger contraction applies a tension force to the second molded body of smaller contraction for thereby inducing compression stress in the molded body of smaller contraction. With- the above method of this invention, a rotor of high mechanical strength can be obtained.

Figure 2:
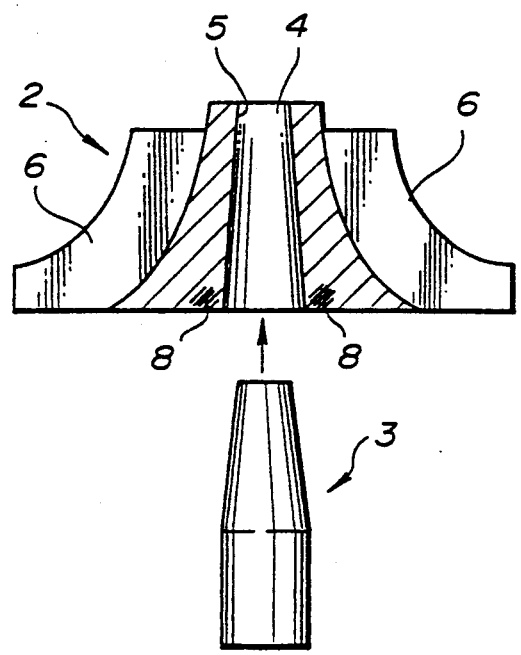
FIG. 2 is an exploded, sectional view of a turbine wheel according to another embodiment of the present invention.
Figure 3:
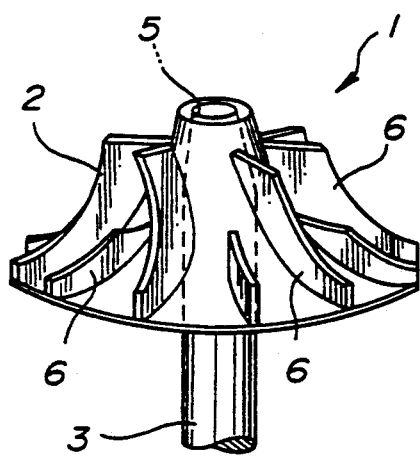
FIG. 3 is a perspective view of the turbine wheel of FIG. 2.

In FIGS. 2 and 3, the rotor 1 is shown as being a turbine wheel for use in a turbocharger, gas turbine, etc. The disk portion 2 has vanes 6 and a tapered hole 4 at the center thereof. The shaft portion 3 is correspondingly tapered so as to fit in the hole 4 of the disk porton 2.

In production of the rotor 1, silicon nitride of average particle size of 0.5 μm is added with 5% alumina and 5% yttria which are adapted to serve as sintering aids or additives for thereby constituting composition powder. The composition powder is then added with 20% binder for injection molding and is heated while being mixed to constitute a body for injection molding. The body is shaped by injection molding so as to have the vanes 6 and the tapered central hole 4 and then dewaxed to constitute an intermediate product for the vaned disk portion 2. The composition powder consisting of silicon nitride of average particle size of 0.5 μm, 5% alumina and 5% yttria is also filled in a rubber tube and compacted by cold isostatic pressing to be formed into a round bar. The bar is then cut into the shaft portion 3 and then fitted in the tapered hole 4 of the vaned disk portion 2. In this instance, by suitably selecting the isostatic pressure applied to the composition powder to be compacted into the round bar during the cold isostatic pressing, the shaft portion 3 is made different in density from the vaned portion 2.

In one example, the shaft portion 3 is formed by the cold isostatic pressing of 500 kg/cm$^2$ and fitted in the tapered central hole 4 of the vaned disk portion 2. The outer surfaces of the shaft portion and the disk portion are coated with latex rubber. The both portions are then subjected to cold isostatic pressing of 5 ton/cm$^2$ and integrally joined together. The shaft portion and the disk portion thus joined together are sintered at 1700° C. in nitrogen atmosphere and formed into the ceramic rotor 1. The ceramic rotor 1 thus produced has residual stress at the interface 5 of the vaned disk portion 2 and the shaft portion 3 due to the density difference therebetween. The ceramic rotor 1 is subjected to maximum stress in the place 8 located adjacent the lower end of the vanes 8 when viewed in FIG. 2 and adjacently outward of the interface 5 of the vaned portion 2 and the boss portion 3.

The rotor 1 was tested in vacuum after correction of balance and it was found that the rotor 1 was broken when it was rotated at the speed of 220,000 rpm. On the other hand, another test was conducted with respect to other examples for comparison. A first example for comparison is of such a kind that its boss portion 3 is formed from the same material as above by the cold isostatic pressing of 700 kg/cm$^2$ in such a way as to have no residual stress. A second example for comparison is of such a kind that its boss portion 3 is formed from the same material as above by the cold isostatic pressing of 1000 kg/cm$^2$ in such a way as to have tension stress. By testing the first and second examples for comparison in vacuum, it was found that the first example for comparison was broken at the speed of 200,000 rpm and the second example for comparison was broken at the speed of 180,000 rpm. In either case, the speed of rotation at which breakage occurs is lower than the corresponding speed of the rotor 1 of the present invention.

What is claimed is:

1. A method of producing a ceramic rotor comprising:
   independently constructing an inner shaft member and an outer tubular member by cold isostatic pressing so that the amount of contraction of said inner shaft member is 0.1% to 3% larger than the amount of contraction of said outer tubular member;
   joining said inner shaft member and said outer tubular member together to form a rotor assembly by inserting said shaft member into a central opening of said outer tubular member;
   selecting a suitable pressure for cold isostatic pressing of said rotor assembly;
   compressing said rotor assembly by cold isostatic pressing at said suitable pressure; and
   sintering said rotor assembly to produce said ceramic rotor.

2. A method of producing a ceramic turbine wheel having a plurality of vanes, comprising:
   independently constructing a shaft portion and a vaned disk portion;
   preparing said shaft portion and said vaned disk portion in a manner such that said vaned disk portion has a central opening for receiving therein said shaft portion;
   preparing said shaft portion and said vaned disk portion in such a way that the amount of contraction of said shaft portion is 0.1% to 3% larger than the amount of contraction of said vaned disk portion;
   fitting said shaft portion in said central opening of said vaned disk portion to form a ceramic turbine wheel assembly;
   compressing said ceramic turbine wheel assembly at a predetermined pressure by cold isostatic pressing; and thereafter
   sintering said ceramic turbine wheel assembly to form said ceramic turbine wheel having a plurality of vanes.

3. A method as set forth in claim 2 wherein said preparing further comprises forming said shaft portion by cold isostatic pressing and forming said vaned disk portion by injection molding.

4. A method as set forth in claim 3 wherein said preparing further comprises dewaxing said vaned disk portion before said fitting.

5. A method as set forth in claim 4, further comprising, after fitting, joining by cold isostatic pressing said shaft portion and said vaned disk portion so as to constitute an integral body.

* * * * *